US012651489B2

(12) United States Patent
Nishioka et al.

(10) Patent No.: US 12,651,489 B2
(45) Date of Patent: Jun. 9, 2026

(54) SOUNDNESS DIAGNOSIS APPARATUS AND SOUNDNESS DIAGNOSIS METHOD

(71) Applicant: Mitsubishi Electric Corporation, Tokyo (JP)

(72) Inventors: Tsutomu Nishioka, Tokyo (JP); Kenji Fujisaki, Tokyo (JP); Tomoharu Takeuchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 32 days.

(21) Appl. No.: 18/682,164

(22) PCT Filed: Sep. 6, 2021

(86) PCT No.: PCT/JP2021/032651
§ 371 (c)(1),
(2) Date: Feb. 8, 2024

(87) PCT Pub. No.: WO2023/032201
PCT Pub. Date: Mar. 9, 2023

(65) Prior Publication Data
US 2024/0378928 A1     Nov. 14, 2024

(51) Int. Cl.
*G07C 5/08*     (2006.01)
*G06N 20/00*    (2019.01)

(52) U.S. Cl.
CPC .......... *G07C 5/0808* (2013.01); *G06N 20/00* (2019.01)

(58) Field of Classification Search
CPC ......... G07C 5/0808; G06N 20/00; B60L 3/00; B60L 3/0023
See application file for complete search history.

(56) References Cited

FOREIGN PATENT DOCUMENTS

JP      2003237561 A     8/2003
JP      2020093770 A  *  9/2020
JP         6851558 B1  * 11/2021

OTHER PUBLICATIONS

International Search Report (PCT/ISA/210) with translation and Written Opinion (PCT/ISA/237) mailed on Nov. 22, 2021 by the Japanese Patent Office as the International Searching Authority for International Application No. PCT/JP2021/032651. (9 pages).
Notification of Reasons for Refusal with translation dated Nov. 16, 2023 issued by the Japanese Patent Office in corresponding Japanese Patent Application No. 2023-544977. (11 pages).

* cited by examiner

*Primary Examiner* — Brian P Sweeney
(74) *Attorney, Agent, or Firm* — BUCHANAN, INGERSOLL & ROONEY PC

(57)     ABSTRACT

A soundness diagnosis apparatus diagnoses soundness of a device includes: a data loading unit that acquires operating data of the device for a diagnosis target period; a feature amount data generation unit that samples, as sample data, a target data segment for feature amount data from the operating data on the basis of a physical characteristic of the device, and generates the feature amount data by using the sample data; an inference unit that performs soundness diagnosis on the feature amount data that is sequentially generated by using a learned model obtained through model learning of a normal state of the device; and a visualization unit that visualizes a transition of a soundness diagnosis result obtained by the inference unit.

18 Claims, 5 Drawing Sheets

FIG.2

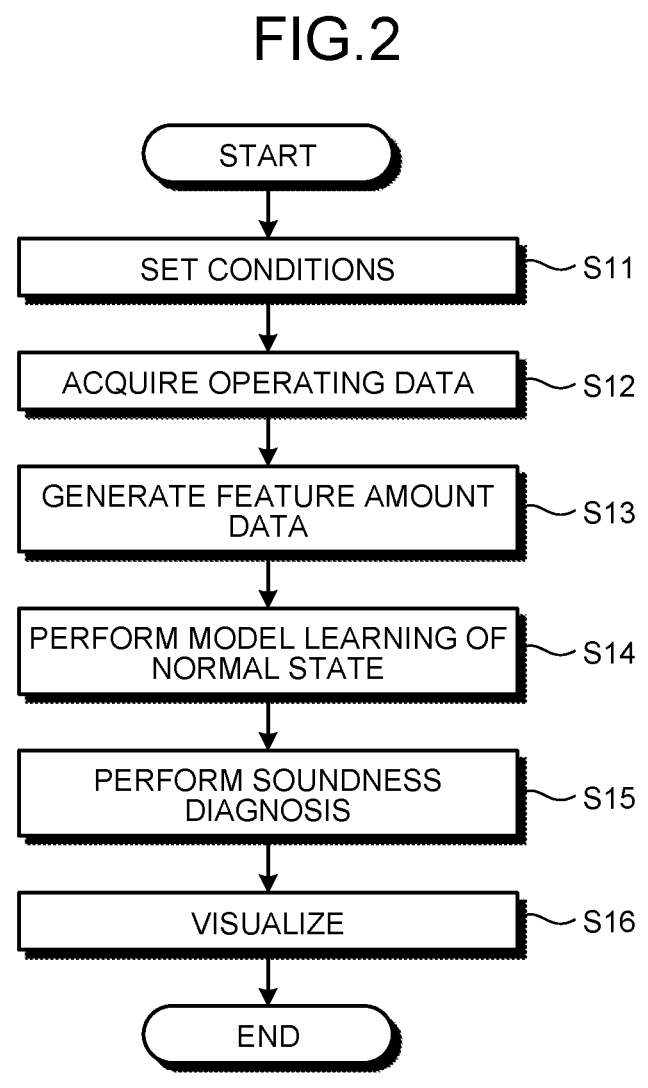

```
        ┌──────────────┐
        │    START     │
        └──────────────┘
                │
                ▼
    ┌───────────────────────────┐
    │      SET CONDITIONS        │── S11
    └───────────────────────────┘
                │
                ▼
    ┌───────────────────────────┐
    │   ACQUIRE OPERATING DATA   │── S12
    └───────────────────────────┘
                │
                ▼
    ┌───────────────────────────┐
    │  GENERATE FEATURE AMOUNT   │── S13
    │           DATA             │
    └───────────────────────────┘
                │
                ▼
    ┌───────────────────────────┐
    │  PERFORM MODEL LEARNING OF │── S14
    │       NORMAL STATE         │
    └───────────────────────────┘
                │
                ▼
    ┌───────────────────────────┐
    │     PERFORM SOUNDNESS      │── S15
    │         DIAGNOSIS          │
    └───────────────────────────┘
                │
                ▼
    ┌───────────────────────────┐
    │         VISUALIZE          │── S16
    └───────────────────────────┘
                │
                ▼
        ┌──────────────┐
        │     END      │
        └──────────────┘
```

START

DETECT BRAKE RELEASE
TIMING AT START OF MOVING
OF RAILWAY VEHICLE — S21

CUT OUT SAMPLE DATA — S22

PERFORM DATA CLEANSING — S23

PERFORM FILTERING — S24

GENERATE FEATURE AMOUNT
DATA — S25

END

90

91

92

PROCESSOR

MEMORY

SOUNDNESS DIAGNOSIS APPARATUS AND SOUNDNESS DIAGNOSIS METHOD

FIELD

The present disclosure relates to a soundness diagnosis apparatus that diagnoses soundness of a device and a soundness diagnosis method.

BACKGROUND

Conventionally, in railway vehicles and the like, sensors are used to detect states of devices mounted on the railway vehicles and the like, and anomaly diagnosis is performed by using sensor data in order to promptly detect occurrence of anomalies. Patent Literature 1 discloses a technique of accurately diagnosing an anomaly of a brake in consideration of various conditions such as a travel section when an object to be diagnosed is a brake mounted on a railway vehicle.

CITATION LIST

Patent Literature

Patent Literature 1: Japanese Patent Application Laid-open No. 2020-093770

SUMMARY OF INVENTION

Problem to be Solved by the Invention

However, according to the above-described conventional technique, when a device to be diagnosed is a device manually operated, such as a brake mounted on a railway vehicle, data detected by a sensor is liable to exhibit individual variations depending on characteristics of each person that operate the device. Therefore, there has been a problem in that when diagnosing the soundness of the device using data including individual variations, the accuracy of diagnosis decreases.

The present disclosure has been made in view of the above, and an object of the present disclosure is to obtain a soundness diagnosis apparatus capable of reducing the decrease in accuracy when diagnosing the soundness of the device.

Means to Solve the Problem

To solve the above problems and achieve an object, the present disclosure is directed to a soundness diagnosis apparatus to diagnose soundness of a device. The apparatus includes: a data loading unit to acquire operating data of the device for a diagnosis target period; a feature amount data generation unit to sample, as sample data, a target data segment for feature amount data from the operating data on a basis of a physical characteristic of the device, and to generate the feature amount data by using the sample data; an inference unit to perform soundness diagnosis on the feature amount data that is sequentially generated by using a learned model obtained through model learning of a normal state of the device; and a visualization unit to visualize a transition of a soundness diagnosis result obtained by the inference unit.

Effects of the Invention

The soundness diagnosis apparatus of the present disclosure can achieve an effect that the decrease in accuracy when diagnosing the soundness of a device can be reduced.

BRIEF DESCRIPTION OF DRAWINGS

FIG. 2 is a flowchart illustrating operation of the soundness diagnosis apparatus according to the embodiment.

DESCRIPTION OF EMBODIMENTS

Hereinafter, a soundness diagnosis apparatus and a soundness diagnosis method according to an embodiment of the present disclosure will be described in detail with reference to the drawings.

Embodiment

Figure 1:
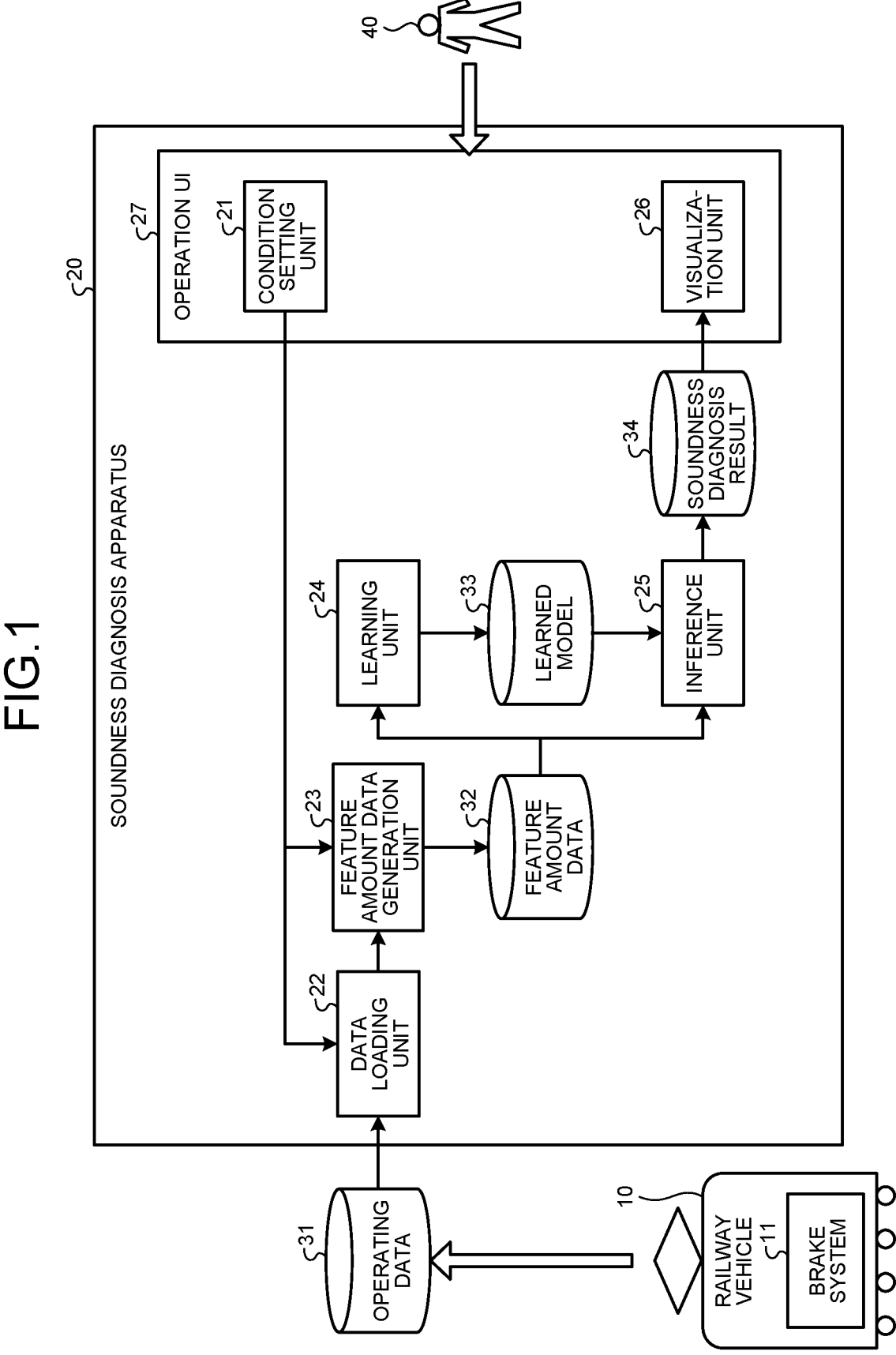
FIG. 1 is a first diagram illustrating a configuration example of a soundness diagnosis apparatus according to an embodiment.

FIG. 1 is a first diagram illustrating a configuration example of a soundness diagnosis apparatus 20 according to the present embodiment. The soundness diagnosis apparatus 20 is an apparatus that uses operating data 31 relating to a device mounted on a railway vehicle 10 to diagnose soundness of the device mounted on the railway vehicle 10. The operating data 31 is data detected by a sensor (not illustrated) or the like mounted on the railway vehicle 10 and indicating an operating state of the device. In the present embodiment, specifically, a case will be described in which the device mounted on the railway vehicle 10 is a brake system 11. The brake system 11 is a system that includes a brake cylinder (not illustrated) and controls a braking force by air pressure.

The configuration and operation of the soundness diagnosis apparatus 20 will be described. As illustrated in FIG. 1, the soundness diagnosis apparatus 20 includes a condition setting unit 21, a data loading unit 22, a feature amount data generation unit 23, a learning unit 24, an inference unit 25, and a visualization unit 26. The condition setting unit 21 and the visualization unit 26 are included in an operation user interface (UI) 27. FIG. 2 is a flowchart illustrating the operation of the soundness diagnosis apparatus 20 according to the present embodiment.

The condition setting unit 21 receives settings of various conditions for the data loading unit 22 and the feature amount data generation unit 23 from a user 40 of the soundness diagnosis apparatus 20, and sets the conditions to the data loading unit 22 and the feature amount data generation unit 23 (step S11). Specifically, the condition setting unit 21 receives, from the user 40, a diagnosis target period that is a target period for which the data loading unit 22 acquires the operating data 31. Furthermore, the condition setting unit 21 receives, from the user 40, settings of various conditions used when the feature amount data generation unit 23 generates feature amount data 32 on the basis of a physical characteristic of the brake system 11. The condition setting unit 21 is, for example, an interface such as a mouse or a keyboard. When the condition setting unit 21 and the visualization unit 26 are integrated as the operation UI 27, the condition setting unit 21 may be a touch panel or the like.

The data loading unit 22 acquires the operating data 31 of the brake system 11 for the diagnosis target period (step S12). In the example of FIG. 1, the data loading unit 22 acquires the operating data 31 for the diagnosis target period from the operating data 31 for the entire period detected by the railway vehicle 10. However, the present invention is not limited thereto. The data loading unit 22 may acquire the operating data 31 for the entire period output from the railway vehicle 10, and may extract the operating data 31 for the diagnosis target period from the operating data 31 for the entire period. Note that the operating data 31 for the entire period detected by the railway vehicle 10 may be stored in a storage unit, and the data loading unit 22 may read the operating data 31 from the storage unit. The data loading unit 22 outputs the operating data 31 of the brake system 11 for the diagnosis target period to the feature amount data generation unit 23.

Figure 3:
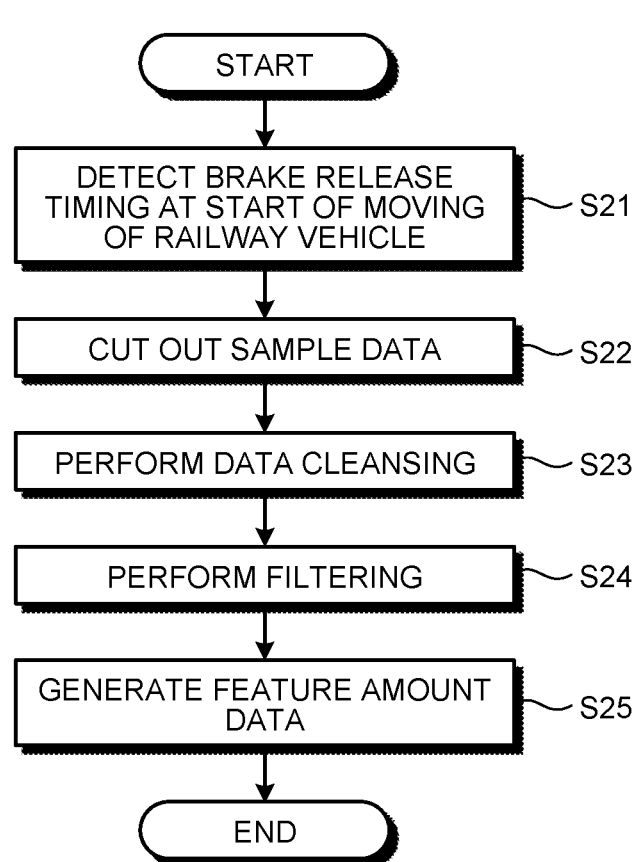
FIG. 3 is a flowchart illustrating operation of generating feature amount data by a feature amount data generation unit of the soundness diagnosis apparatus according to the embodiment.

The feature amount data generation unit 23 samples a target data segment for the feature amount data 32 from the operating data 31 as sample data on the basis of the physical characteristic of the device, that is, the brake system 11, and generates the feature amount data 32 by using the sample data thus sampled (step S13). Operation of generating the feature amount data 32 by the feature amount data generation unit 23 will be described in detail. FIG. 3 is a flowchart illustrating the operation of generating the feature amount data 32 by the feature amount data generation unit 23 of the soundness diagnosis apparatus 20 according to the present embodiment.

The feature amount data generation unit 23 detects a brake release timing at the start of moving of the railway vehicle 10 from data of brake cylinder pressure included in the operating data 31 on the basis of, for example, vehicle speed information and brake notch information of the railway vehicle 10 (step S21).

In general, in order to perform soundness diagnosis on the brake system 11, it is necessary to generate the feature amount data 32 corresponding to the physical characteristic of the brake system 11. The feature amount data 32 needs to constantly exhibit an identical behavior, and the tendency of the behavior needs to change little by little along with a change in soundness, that is, the deterioration progress. The operating data 31 of the brake system 11 is constantly acquired during traveling of the railway vehicle 10 and the value thereof variously changes due to complicated control during traveling. Therefore, it is necessary to sample a feature amount having a characteristic of the above-described deterioration progress from the operating data 31. The brake system 11 of the railway vehicle 10 is mainly used at the time of deceleration, stop, and the like. However, the brake system 11 is liable to exhibit, in its operation, characteristics of drivers of the railway vehicle 10, that is, individual variations. Furthermore, even with an identical brake level, the braking force changes depending on the difference in occupancy of the railway vehicle 10. Therefore, in the present embodiment, focusing on the time point when the railway vehicle 10 starts moving, that is, when the brake is released, data of a portion where the brake cylinder pressure decreases with the release of the brake is sampled and used as a target data for the feature amount data 32. The portion where the brake cylinder pressure decreases with the release of the brake is a brake cylinder (BC) pressure falling portion where the air in the brake cylinder is released. For the falling of the BC pressure, individual variations are minimal between drivers, and the falling of the BC pressure exhibits an identical behavior as the physical characteristic of the brake system 11, and thus meets the requirement of the feature amount data 32 having the characteristic of the above-described deterioration progress.

The feature amount data generation unit 23 samples a prescribed time series range including the brake release timing at the start of moving of the railway vehicle 10, that is, a time point when the BC pressure falls, from the data of the brake cylinder pressure included in the operating data 31, as sample data (step S22). The feature amount data generation unit 23 may sample the sample data with the time point when the BC pressure falls as a start point, or may sample the sample data with a prescribed time point that is before the time point when the BC pressure falls as a start point.

The feature amount data generation unit 23 performs data cleansing of the sample data sampled (step S23). The feature amount data generation unit 23 can eliminate elements that become noise when calculating the feature amount data 32, by removing irregular sample data that clearly behaves differently from those indicating change due to aging.

The feature amount data generation unit 23 performs filtering to extract, from the sample data after being subjected to data cleansing, sample data that matches set conditions (step S24). The feature amount data generation unit 23 narrows down environmental conditions during traveling of the railway vehicle 10 to unify the environmental conditions during traveling of the railway vehicle 10, that is, to unify analysis conditions in the soundness diagnosis. For example, the feature amount data generation unit 23 performs filtering on the basis of the position of a brake notch at the time of stop, the occupancy of the railway vehicle 10, the speed of brake release, and the like. Note that it is also expected that the occupancy exhibits different tendencies depending on the routes in which the railway vehicle 10 is used. Therefore, the feature amount data generation unit 23 may change the condition used when performing filtering depending on the route in which the railway vehicle 10 is used. Furthermore, the feature amount data generation unit 23 may perform filtering for classification into a plurality of conditions instead of narrowing down to one condition so as to unify the analysis conditions in the soundness diagnosis. For example, when filtering is performed on the basis of the occupancy of the railway vehicle 10, the feature amount data generation unit 23 may perform filtering so as to categorize the occupancy into groups such as less than 30%, 30% or more and less than 70%, and 70% or more.

The feature amount data generation unit 23 generates the feature amount data 32 by processing the sample data after being subjected to filtering (step S25). The feature amount data generation unit 23 processes the sample data after being subjected to filtering on the basis of domain knowledge, that is, the physical characteristic of the brake system 11 that is a device to be diagnosed. For example, the feature amount data generation unit 23 may obtain a temporary difference by performing first-order differentiation, may obtain a cumulative sum by performing first-order integration, or may combine a plurality of feature amounts. The feature amount data generation unit 23 outputs the generated feature amount data 32 to the learning unit 24 and the inference unit 25. Note that the feature amount data generation unit 23 may store the generated feature amount data 32 in a storage unit. In this case, the learning unit 24 and the inference unit 25 read the feature amount data 32 from the storage unit.

In this manner, the feature amount data generation unit 23 samples, on the basis of the vehicle speed information and the brake notch information of the railway vehicle 10, a range including a timing at which the brake is released at the start of moving of the railway vehicle 10 as sample data from data of the brake cylinder pressure included in the operating data 31. It can also be said that the feature amount data generation unit 23 samples a range including a timing at which the brake of the railway vehicle 10 is released from the operating data 31 as sample data. The feature amount data generation unit 23 performs data cleansing of the sample data thus sampled, and performs filtering to unify environmental conditions during traveling of the railway vehicle 10. The feature amount data generation unit 23 generates, on the basis of the physical characteristic of the brake system 11, the feature amount data 32 by processing the sample data after being subjected to filtering.

Returning to the description of the soundness diagnosis apparatus 20. The learning unit 24 performs model learning of a normal state by using the feature amount data 32 acquired during a normal time among the feature amount data 32 (step S14). The learning unit 24 obtains a learned model 33 as a result of the model learning. The feature amount data 32 acquired during the normal time may be based on data obtained during the time of a test in a factory where the railway vehicle 10 is manufactured, or may be based on data obtained during the initial stage of introduction from when the railway vehicle 10 starts its operation for a prescribed period. The learning unit 24 performs model learning of the normal state by using machine learning. For example, an outlier detection method can be used as a model of machine learning. More specifically, the outlier detection method includes an algorithm such as a one class support vector machine (OCSVM), but is not limited thereto. A method other than the outlier detection method, such as deep learning, may be used as the model of machine learning. The learning unit 24 outputs the learned model 33 obtained as a result of the model learning to the inference unit 25. Note that the learning unit 24 may store the learned model 33 in a storage unit. In this case, the inference unit 25 reads the learned model 33 from the storage unit.

The inference unit 25 performs soundness diagnosis on the feature amount data 32 that is sequentially generated by using the learned model 33 obtained through model learning of the normal state of the device, that is, by using the learned model 33 obtained as a result of the model learning by the learning unit 24 (step S15). The inference unit 25 may perform soundness diagnosis on the feature amount data 32 that is sequentially generated at a prescribed interval, for example, every week, or may perform soundness diagnosis at a timing specified and desired by the user 40 for confirmation. In the soundness diagnosis method, for example, the inference unit 25 calculates a degree of deviation from the normal state, with respect to the feature amount data 32 that is sequentially generated, as a score, and normalizes the degree of deviation from the normal state that has been scored to obtain a soundness diagnosis result 34. When utilizing the OCSVM, the inference unit 25 calculates a distance from a boundary plane of the learned model 33 to each feature amount data 32, and normalizes the distance. The inference unit 25 outputs the soundness diagnosis result 34 obtained as a result of performing the soundness diagnosis, to the visualization unit 26. Note that the inference unit 25 may store the soundness diagnosis result 34 in a storage unit. In this case, the visualization unit 26 reads the soundness diagnosis result 34 from the storage unit.

The visualization unit 26 visualizes the transition of the soundness diagnosis result 34 obtained by the inference unit 25 (step S16). For example, the visualization unit 26 utilizes scatter diagrams, line graphs, or the like to visualize tendency of transition of the soundness diagnosis result 34 based on multiple feature amount data 32 by chronologically plotting the soundness diagnosis result 34 from the past to the present.

Here, the soundness diagnosis apparatus 20 is assumed to be used by, as the user 40, an engineer or the like of a device manufacturer that manufactures the device mounted on the railway vehicle 10, such as the brake system 11 illustrated in the example of FIG. 1. The user 40 of the device manufacturer estimates a future tendency of soundness from the tendency of transition of the soundness diagnosis result 34 from the past to the present, and recommends maintenance of the brake system 11, replacement of the device, and the like to the railway company at an optimum timing. The user 40 may determine the timing of the maintenance of the brake system 11, the timing of the replacement of the device, and the like by setting a plurality of thresholds to the soundness diagnosis result 34, for example. At this time, the user 40 makes a determination by confirming statistical results of the soundness diagnosis result 34 from both a microscopic perspective based on each sample point and a macroscopic perspective based on the regular soundness diagnosis result 34, such as on a monthly basis. For example, when maintenance has been performed by a railway company on the railway vehicle 10, it is also assumed that the tendency of the feature amount data 32 obtained by the soundness diagnosis apparatus 20 may differ before and after the maintenance. In general, when maintenance has been performed by the railway company on the railway vehicle 10, it is considered that the feature amount data 32 tends to be improved. When the tendency of the feature amount data 32 has been changed since a certain time point, the user 40 assumes that the maintenance has been performed by the railway company, and confirms the soundness diagnosis result 34. When information on maintenance of the railway vehicle 10 can be obtained from the railway company, the user 40 confirms the soundness diagnosis result 34 on the basis of the information on maintenance.

Regarding the installation place of the soundness diagnosis apparatus 20, the soundness diagnosis apparatus 20 may be installed in the device manufacturer described above. Alternatively, the operation UI 27 of the soundness diagnosis apparatus 20 may be installed in the device manufacturer and the remaining portion may be installed in the railway company that operates the railway vehicle 10 or in the railway vehicle 10. When the portion such as the operation UI 27 is installed in the device manufacturer and the remaining portion is installed in the railway company that operates the railway vehicle 10 or in the railway vehicle 10, the operation UI 27 may be a terminal device such as a tablet. The soundness diagnosis apparatus 20 can remotely diagnose soundness of the brake system 11 even if the soundness diagnosis apparatus 20 is installed in a place different from the place where the brake system 11 to be diagnosed is installed. Since the operation UI 27 is at hand, regardless of where the remaining portion of the soundness diagnosis apparatus 20 other than the operation UI 27 is installed, the user 40 of the soundness diagnosis apparatus 20 can set conditions to the data loading unit 22 and the feature amount data generation unit 23 by using the condition setting unit 21, and confirm the soundness diagnosis result 34 visualized by the visualization unit 26.

Note that the condition setting unit 21 receives settings of various conditions for the data loading unit 22 and the feature amount data generation unit 23 from the user 40, and sets the conditions to the data loading unit 22 and the feature amount data generation unit 23. However, the present invention is not limited thereto. The condition setting unit 21 may receive settings of conditions regarding the learning method in the learning unit 24, the timing of soundness diagnosis in the inference unit 25, and the like, from the user 40, and may set the conditions to the learning unit 24 and the inference unit 25.

Next, a hardware configuration of the soundness diagnosis apparatus 20 according to the present embodiment will be described. In the soundness diagnosis apparatus 20, the condition setting unit 21 is an interface that receives operation from the user 40. In the visualization unit 26, a portion that displays the soundness diagnosis result 34 is a display such as a liquid crystal display (LCD). Among the data loading unit 22, the feature amount data generation unit 23, the learning unit 24, the inference unit 25, and the visualization unit 26, portions other than the portion that displays the soundness diagnosis result 34 are implemented by processing circuitry. The processing circuitry may be a memory that stores a program and a processor that executes the program stored in the memory, or may be dedicated hardware. The processing circuitry is also referred to as a control circuit.

Figure 4:
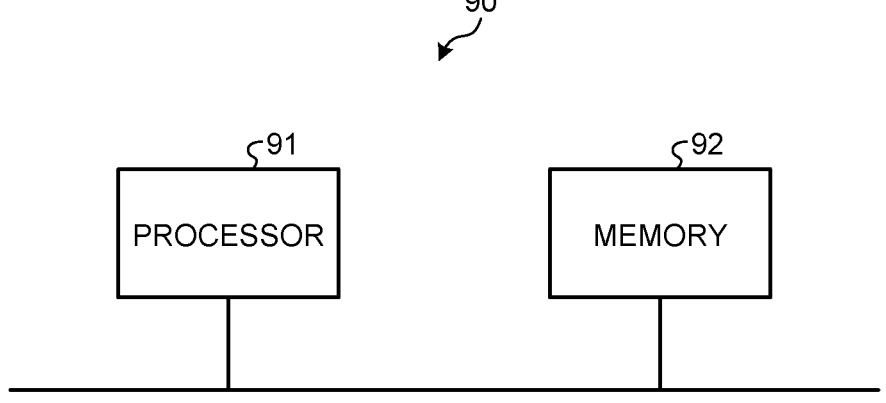
FIG. 4 is a diagram illustrating an example of a configuration of processing circuitry when the processing circuitry included in the soundness diagnosis apparatus according to the embodiment is implemented by a processor and a memory.

FIG. 4 is a diagram illustrating an example of a configuration of processing circuitry 90 when the processing circuitry included in the soundness diagnosis apparatus 20 according to the present embodiment is implemented by a processor 91 and a memory 92. The processing circuitry 90 illustrated in FIG. 4 is a control circuit and includes the processor 91 and the memory 92. If the processing circuitry 90 includes the processor 91 and the memory 92, each function of the processing circuitry 90 is implemented by software, firmware, or a combination of software and firmware. Software or firmware is described as a program and stored in the memory 92. In the processing circuitry 90, the processor 91 reads and executes the program stored in the memory 92 to implement each function. That is, the processing circuitry 90 includes the memory 92 for storing the program that causes the processing of the soundness diagnosis apparatus 20 to be resultantly executed. It can also be said that this program is a program for causing the soundness diagnosis apparatus 20 to execute each function implemented by the processing circuitry 90. This program may be provided by a storage medium in which the program is stored, or may be provided by other means such as a communication medium.

The program described above can also be said as a program that causes the soundness diagnosis apparatus 20 to execute: an acquisition step of acquiring, by the data loading unit 22, the operating data 31 of the device for the diagnosis target period; a generation step of sampling, by the feature amount data generation unit 23, a target data segment for the feature amount data 32 from the operating data 31 as sample data on the basis of the physical characteristic of the device, and of generating the feature amount data 32 by using the sample data; a learning step of performing, by the learning unit 24, model learning of the normal state by using feature amount data 32 acquired during a normal time among the feature amount data 32; an inference step of performing, by the inference unit 25, soundness diagnosis on the feature amount data 32 that is sequentially generated by using the learned model 33 obtained as a result of the model learning by the learning unit 24; and a visualizing step of visualizing, by the visualization unit 26, a transition of the soundness diagnosis result 34 obtained by the inference unit 25.

Here, the processor 91 is, for example, a central processing unit (CPU), a processing device, an arithmetic device, a microprocessor, a microcomputer, a digital signal processor (DSP), or the like. Furthermore, the memory 92 corresponds to a nonvolatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disk, a mini disk, a digital versatile disc (DVD), a Blu-ray disc, a hard disk drive (HDD), or the like.

Figure 5:
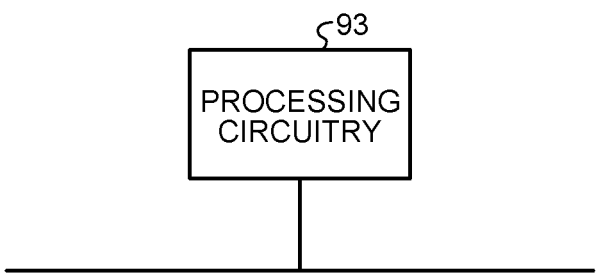
FIG. 5 is a diagram illustrating an example of a configuration of processing circuitry when the processing circuitry included in the soundness diagnosis apparatus according to the embodiment includes dedicated hardware.

FIG. 5 is a diagram illustrating an example of a configuration of processing circuitry 93 when the processing circuitry included in the soundness diagnosis apparatus 20 according to the present embodiment includes dedicated hardware. For example, the processing circuitry 93 illustrated in FIG. 5 corresponds to a single circuit, a composite circuit, a programmed processor, a parallel programmed processor, an application specific integrated circuit (ASIC), a field programmable gate array (FPGA), or a combination thereof. The processing circuitry 93 may be partially implemented by dedicated hardware, and partially implemented by software or firmware. In this manner, the processing circuitry 93 can implement the above-described functions by using dedicated hardware, software, firmware, or a combination thereof.

As has been described above, according to the present embodiment, with respect to the brake system 11 that is a device mounted on the railway vehicle 10, the soundness diagnosis apparatus 20 samples the data of the BC pressure falling portion in which the brake cylinder pressure decreases at the time point when the railway vehicle 10 starts moving, that is, the time point when the brake is released, from the operating data 31. Then, the soundness diagnosis apparatus 20 performs data cleansing, filtering, and the like to generate the feature amount data 32. The soundness diagnosis apparatus 20 learns data acquired during the normal time by machine learning by using the feature amount data 32, and diagnoses the soundness of the brake system 11 on the basis of the degree of deviation from the data acquired during the normal time. As a result, the soundness diagnosis apparatus 20 is less affected by individual variations between drivers, even for the device that is liable to exhibit, in its operation, individual variations between drivers of the railway vehicle 10, and can reduce the decrease in accuracy when diagnosing the soundness of the device.

Furthermore, the soundness diagnosis apparatus 20 can obtain the feature amount data 32 on the basis of the operating data 31 that is already accessible. Therefore, the soundness diagnosis apparatus 20 can perform soundness diagnosis without additionally introducing a special sensor, a detection device, or the like.

The user 40 of the soundness diagnosis apparatus 20 can remotely confirm the current soundness of the brake system 11 without inspecting the actual brake system 11 of the railway vehicle 10 on site, and can determine the timing of the maintenance and the timing of the replacement of the device.

Note that, in the present embodiment, a case where the device to be diagnosed, the soundness of which is diagnosed by the soundness diagnosis apparatus 20, is the brake system 11 has been specifically described. However, the device to be diagnosed, the soundness of which is diagnosed by the soundness diagnosis apparatus 20, is not limited to the brake system 11. In the present embodiment, the data of the BC pressure falling portion at the start of moving of the railway vehicle 10 is sampled as the target data for the feature amount data 32 of the brake system 11. However, even for devices operated by individuals, as long as there is a timing at which data exhibits minimal individual variations and similar behavior can be detected as a physical characteristic, the soundness diagnosis apparatus 20 can be applied.

Figure 6:
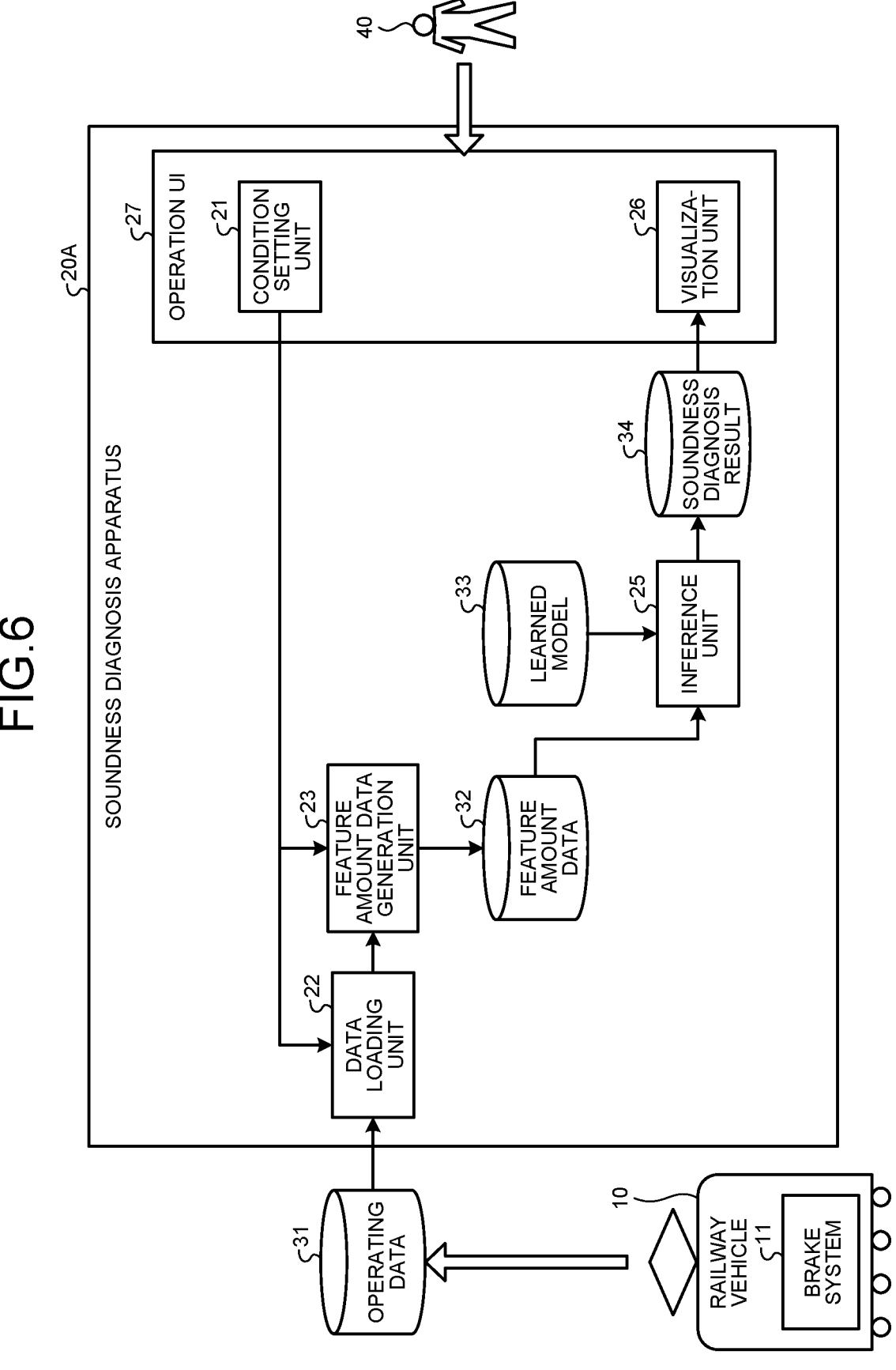
FIG. 6 illustrates a second diagram of a configuration example of a soundness diagnosis apparatus according to an embodiment.

Moreover, in the present embodiment, the configuration in which the soundness diagnosis apparatus 20 includes the learning unit 24 has been specifically described, but the configuration of the soundness diagnosis apparatus 20 is not limited thereto. For example, if it is not necessary to perform model learning of the normal state for every device to be diagnosed or every user 40, a soundness diagnosis apparatus 20A may have a configuration not including the learning unit 24 as illustrated in FIG. 6. FIG. 6 illustrates a second diagram of a configuration example of the soundness diagnosis apparatus 20A according to the present embodiment. In this case, model learning of the normal state is performed in advance by using the feature amount data 32 acquired during a normal time among the feature amount data 32 in a learning unit (not illustrated) provided outside the soundness diagnosis apparatus 20A, and the learned model 33 obtained as a result of the model learning is stored in a storage unit inside the soundness diagnosis apparatus 20A. The inference unit 25 can read the learned model 33 obtained through model learning of the normal state of the device from the storage unit, and can perform soundness diagnosis on the feature amount data 32 that is sequentially generated by using the read learned model 33.

The configurations described in the above embodiment are just examples and can be combined with other known techniques. The embodiments can be combined with each other and the configurations can be partially omitted or changed without departing from the gist.

REFERENCE SIGNS LIST

10 railway vehicle; 11 brake system; 20, 20A soundness diagnosis apparatus; 21 condition setting unit; 22 data loading unit; 23 feature amount data generation unit; 24 learning unit; 25 inference unit; 26 visualization unit; 27 operation UI; 31 operating data; 32 feature amount data; 33 learned model; 34 soundness diagnosis result; 40 user.

The invention claimed is:

1. A soundness diagnosis apparatus to diagnose soundness of a device, the apparatus comprising:
an interactive interface configured for receiving an input from a user and generating at least a visual output to a user;
processing circuitry configured to:
acquire operating data from the device for a diagnosis target period;

sample, as sample data, a target data segment for feature amount data from the operating data on a basis of a physical characteristic of the device, and generate the feature amount data by using the sample data;
perform soundness diagnosis on the feature amount data that is sequentially generated by using a learned model obtained through model learning of a normal state of the device; and
output a transition of a soundness diagnosis result to the interactive interface, the output initiating a timing for the device to be serviced or replaced,
wherein:
the device is a brake system mounted on a railway vehicle, and
the processing circuitry samples, as the sample data, a range including a timing at which a brake of the railway vehicle is released from the operating data.

2. The soundness diagnosis apparatus according to claim 1, wherein:
the processing circuitry trains the learned model using the feature amount data acquired during a normal time among the feature amount data.

3. The soundness diagnosis apparatus according to claim 2, wherein
the processing circuitry trains the learned model using machine learning, and
calculates a degree of deviation from the normal state, with respect to the feature amount data that is sequentially generated, as a score, and normalizes the degree of deviation from the normal state that is scored as the soundness diagnosis result.

4. The soundness diagnosis apparatus according to claim 1, wherein
the processing circuitry samples, as the sample data, a range including a timing at which a brake is released at a start of moving of the railway vehicle from data of brake cylinder pressure included in the operating data on the basis of vehicle speed information and brake notch information of the railway vehicle.

5. The soundness diagnosis apparatus according to claim 1, wherein
the processing circuitry performs data cleansing of the sample data that is sampled, and performs filtering to unify an environmental condition during traveling of the railway vehicle.

6. The soundness diagnosis apparatus according to claim 5, wherein
the processing circuitry generates the feature amount data by processing the sample data after being subjected to filtering on the basis of the physical characteristic of the device.

7. The soundness diagnosis apparatus according to claim 1, wherein
the interactive interface visualizes a tendency of transition of the soundness diagnosis result by chronologically plotting the soundness diagnosis result from past to present.

8. The soundness diagnosis apparatus according to claim 1, wherein
the interactive interface of the soundness diagnosis apparatus is installed in a place different from the device, and remotely diagnoses the soundness of the device.

9. The soundness diagnosis apparatus according to claim 8,
wherein the interactive interface is configured to receive configuration data from a user, the configuration data including the diagnosis target period that is a target period for which the processing circuitry acquires the operating data, and settings of various conditions used when the processing circuitry generates the feature amount data based on the physical characteristic of the device, wherein the user of the interactive interface sets the conditions by using the interactive interface to confirm the soundness diagnosis result visualized.

10. A soundness diagnosis method to diagnose soundness of a device, the method comprising:

receiving, via an interactive interface, configuration data for monitoring an operation of the device;

acquiring operating data of the device for a diagnosis target period;

sampling a target data segment for feature amount data from the operating data as sample data on a basis of a physical characteristic of the device, and of generating the feature amount data by using the sample data;

performing soundness diagnosis on the feature amount data that is sequentially generated by using a learned model obtained through model learning of a normal state of the device; and outputting a transition of a soundness diagnosis result obtained to the interactive interface, the output initiating a timing for the device to be serviced or replaced, wherein the device is a brake system mounted on a railway vehicle, and in the generation, a range including a timing at which a brake of the railway vehicle is released from the operating data is sampled as the sample data.

11. The soundness diagnosis method according to claim 10, comprising training the learned model using the feature amount data acquired during a normal time among the feature amount data.

12. The soundness diagnosis method according to claim 11, wherein the learned model is trained using machine learning, and the learned model performs an inferencing in which a degree of deviation from the normal state, with respect to the feature amount data that is sequentially generated, is calculated as a score, and the degree of deviation from the normal state that is scored as the soundness diagnosis result is normalized.

13. The soundness diagnosis method according to claim 10, wherein in the generation, as the sample data, a range including a timing at which a brake is released at a start of moving of the railway vehicle is sampled from data of brake cylinder pressure included in the operating data on the basis of vehicle speed information and brake notch information of the railway vehicle.

14. The soundness diagnosis method according to claim 10, wherein in the generation, data cleansing of the sample data that is sampled, and filtering to unify an environmental condition during traveling of the railway vehicle are performed.

15. The soundness diagnosis method according to claim 14, wherein in the generation, the feature amount data is generated by processing the sample data after being subjected to filtering on the basis of the physical characteristic of the device.

16. The soundness diagnosis method according to claim 10, wherein in the outputting, a tendency of transition of the soundness diagnosis result is visualized by the interactive interface by chronologically plotting the soundness diagnosis result from past to present.

17. The soundness diagnosis method according to claim 10, wherein the interactive interface of the soundness diagnosis apparatus is installed in a place different from the device, and remotely diagnoses the soundness of the device.

18. The soundness diagnosis method according to claim 17, comprising:

receiving, from a user through the interactive interface, the configuration data which includes the diagnosis target period that is a target period for acquiring the operating data, and settings of various conditions used for generating the feature amount data based on the physical characteristic of the device, wherein the user of the interactive interface sets the conditions and confirms the soundness diagnosis result visualized.

* * * * *